April 16, 1957   R. W. KINDLE ET AL   2,788,839
METHOD OF MAKING TUBELESS TIRE
Filed Sept. 16, 1953
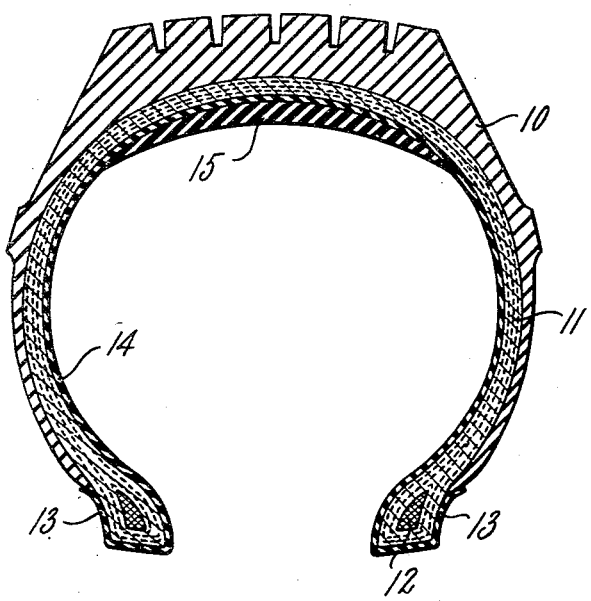
LINER MADE OF BLEND OF
BUTYL RUBBER CHEMICALLY
MODIFIED BY RESOL PHENOLIC
RESIN WITH ANOTHER RUBBER
INVENTORS
ROBERT W. KINDLE
JOHN J. FLEMING
BY James J. Long
AGENT

United States Patent Office 2,788,839
Patented Apr. 16, 1957

2,788,839

METHOD OF MAKING TUBELESS TIRE

Robert W. Kindle, Detroit, and John J. Fleming, Grosse Pointe Woods, Mich., assignors to United States Rubber Company, New York, N. Y., a corporation of New Jersey Application September 16, 1953, Serial No. 380,566

1 Claim. (Cl. 154—14)

This invention relates to an improved pneumatic tire, and more particularly it relates to a pneumatic tire of the tubeless type embodying an air-retaining envelope comprised of a mixture of natural rubber or butadiene-styrene synthetic rubber and Butyl rubber that has been chemically modified by reaction with certain phenolic resins of the resol type, as well as to a method of making such improved tire.

Pneumatic tires of the tubeless type conventionally include an inner layer or liner of air-retaining material adhered to the band ply of the tire casing, and serving as an impermeable envelope for the air within the tire, in place of the usual inner tube. The composition and manufacture of such a lining material for tubeless tires has up to the present time presented a serious difficulty in the manufacture of satisfactory tubeless tires, because the materials proposed for this purpose have all had certain shortcomings, either from the standpoint of preparation or performance, or both. This situation arises because there are a number of exacting requirements that must be met in a practical tubeless tire liner, and those skilled in this art have not up to the present time been able to work out an entirely satisfactory process and composition. No obvious solution to the problem has been forthcoming because the lining material, besides being sufficiently impermeable to air to permit the tire to be used for reasonable periods without requiring reinflation, must also have sufficient adhesiveness to remain securely united to the inner surface of the tire casing, which is usually made of a composition based mainly on natural rubber or such synthetic rubbers as GR-S. At the same time, it is essential that the liner have good physical properties, so that it does not heat up or deteriorate in use and so that it does not tend to develop cracks under the influence of the repeated severe flexing that it is subjected to in use. In addition, the liner must have good building tack and form secure splices.

The requirement that the liner stock shall not crack in use has been particularly difficult to fulfill satisfactorily, and as a result many premature failures have been noted in conventional tubeless tires consequent to the fact that air under pressure passes through such cracks from the interior of the tire into the interstices of the carcass plies, where it expands under the influence of the elevated temperatures developed in use, thereby causing separation and failure of the reinforcing plies. This type of failure commonly manifests itself as a "blowout" that occurs suddenly and without warning, to the peril of the occupants of the vehicle on which the tire is used.

Accordingly, the principal object of the present invention is to provide a pneumatic tire embodying a liner material that obviates the difficulties experienced with prior are tubeless tires.

Another object of the invention is the provision of a method of making a tubeless tire liner material that can be carried out efficiently and economically in the plant.

The manner in which the invention accomplishes the foregoing objects, as well as additional objects and advantages, will be made manifest in the following detailed description, which is intended to be read with reference to the accompanying drawing, the single figure of which represents in transverse cross section a typical tubeless tire made in accordance with the invention.

The invention contemplates provision of a liner composition for tubeless tires based on the Butyl type of synthetic rubber, that is, a low temperature rubbery copolymerizate of an isoolefin such as isobutylene with a conjugated diolefin such as isoprene or butadiene. Such synthetic elastomers are made by well known methods, usually from isoolefins having from 4 to 6 carbon atoms and conjugated diolefiins having from 4 to 8 carbon atoms, the proportion of combined diolefin in the copolymer usually being within the range of from 0.5 to 10%, and more preferably from 0.5 to 5%. Butyl rubber has the advantage of providing the desired good air retention, but it cannot be used of itself as a practical liner material because it is not compatible with natural rubber or the synthetic type rubbers used in tire carcasses, and therefore an all-Butyl liner stock has very poor adhesion to the tire carcass stock, or even to the tire fabrics treated with the usual adhesives, that are commonly based on natural or synthetic rubber latex containing a small amount of phenolaldehyde resin.

If it is attempted to render the Butyl rubber adhesive to the tire carcass by incorporating natural rubber or such synthetic rubbers as GR-S (butadiene-styrene copolymer) with the Butyl, the results are entirely unsatisfactory because of the non-homogeneous nature of such a mixture. The incompatibility between the Butyl rubber and the other rubber manifests itself in extremely poor physical properties, so that such a mixture has no utility. Such blends cannot be successfully vulcanized because the natural rubber or GR-S rubber in the blend combines with the available curatives in the mixture.

The present invention is based upon the unexpected discovery that if the Butyl rubber is first modified by reacting it, under critical conditions, with critical, small amounts of certain phenolic resins of the resol type, the Butyl rubber is converted into a condition in which it is apparently readily compatible with natural rubber or GR-S, yielding a blend that is capable of developing good physical properties upon vulcanization, and that adheres unusually well to the usual tire carcass materials. The resol phenolic resins suitable for effecting the desired chemical modification of the Butyl rubber are the self-condensation polymers 2,6-dimethylol-4-hydrocarbon substituted phenols. These resins are heat-reactive and oil-soluble and they are commercially available under several trade names, with various para-hydrocarbon substituents, which are usually alkyl groups, although such substituent may also be a cycloalkyl group such as cyclohexyl, an aryl group such as phenyl, or an aralkyl group such as benzyl and cumyl, or other hydrocarbon groups. The resols in which para-substituent is alkyl are preferred, and of these tertiary-butyl and tertiary-octyl are especially preferred.

In carrying out the invention, the Butyl rubber is masticated at an elevated temperature in the presence of from 0.1 to 4.0 parts of such resol phenolic resin, per 100 parts of the Butyl rubber. Preferably, the amount of phenolic resin modifier employed is from 0.5 to 1.5 parts, per 100 parts of the Butyl rubber. Such mastication is preferably carried out in the presence of carbon black, and we preferably employ from about 25 to 75 parts of carbon black to 100 parts of Butyl rubber at this stage. Generally, we mix the carbon black thoroughly with the rubber before we add the resol phenolic resin for the purpose of effecting the required chemical modification.

With the foregoing amounts of chemical modifying agent, the desired chemical modification proceeds to the required critical extent that the mixture is masticated for a time ranging from 3 minutes at 400° F. to 60 minutes at 300° F., and preferably for 5 to 25 minutes at 350–375° F. It is a characteristic of this treatment that the chemical action of the resol phenolic resin on the Butyl rubber is substantially exhausted. The thus-modified Butyl is in no sense a cured or vulcanized material, and it is readily processable, and it is still definitely an unsaturated material susceptible of vulcanization or cure by the action of suitable added curatives.

After the modifying step, the batch is usually discharged on a mill and sheeted out. The mix gives a smooth sheet on the mill and can be handled in the same way as any raw Butyl-carbon black master batch. No further processing or treatment of the Butyl rubber is necessary.

The next essential step in the method of the invention is to mix the thus-modified Butyl rubber with another type of rubber, preferably corresponding to the kind of rubber predominating in the tire carcass stock, which is usually either natural rubber or GR–S rubber, the natural rubber being preferred. The desired physical properties are provided by mixing from 45% to 75% of the Butyl rubber hydrocarbon with correspondingly from 55% to 25% of the other rubber. At this stage, there is preferably mixed in additional carbon black, usually amounting to from 25 to 75 parts, per 100 parts of the other rubber. The usual processing aids and conventional vulcanizing ingredients are also added to the mix at this point. Although it is preferable that the rubber that is mixed with the chemically modified Butyl be the same rubber as that of the carcass stock, satisfactory results are also obtainable if these rubbers are not the same. For example, a chemicaly modified Butyl may be mixed with GR–S in the liner, for application to a carcass of natural rubber, or natural rubber may be mixed in the liner to be applied to a GR–S carcass.

Upon vulcanization of a completed stock of this kind, it is surprisingly found that the physical properties of the vulcanizate far exceed those of the Butyl rubber compositions that have heretofore been proposed for use as tubeless tire liners. At the same time, the air retention properties of the stock are excellent and the adhesion of this type of liner compound to carcass stocks and adhesive treated fabrics is superior to the usual Butyl compositions.

The following examples will serve to illustrate various aspects of the invention in more detail. In the examples all parts are expressed by weight.

EXAMPLE I

Referring to the drawing, the invention was employed to make a tubeless tire including the usual outer rubber covering 10 constituting the tread and sidewall, beneath which there was disposed the usual carcass 11 composed of a plurality of plies of adhesive-treated cord fabric skim coated with conventional carcass stock based on natural rubber. The tire included the usual inextensible bead elements 12 in the ends of the carcass, and the under and outer portions of the bead area were provided with a suitable rim sealing arrangement 13. The liner composition was applied to the interior surface or band ply surface of the carcass in the form of a sheet 14 extending from one bead area to the other, in adhesive contact with the carcass stock, or, if there is no covering of carcass stock on the interior band ply surface, then the liner is in adhesive contact with the cords themselves, bearing the latex-resin adhesive material. The interior crown surface of the liner preferably has applied thereover a layer 15 of puncture-sealing material, that is capable of sealing any holes accidentally made in the tire by puncturing objects such as nails. The method of assembling the foregoing parts in their proper relation and vulcanizing the assembly in the desired shape in a mold is well understood by those skilled in this art, and requires no detailed description here.

The liner 14 of the invention was made by first compounding the following modified Butyl master batch:

*Modified Butyl master batch*

| | |
|---|---:|
| GR–I 25 | 150.00 |
| FEF carbon black | 75.00 |
| Amberol ST–137 | 1.00 |
| | 226.00 |

The Amberol ST–137 was a trade preparation of the resol phenolic resin type, comprising a resinous oil-soluble heat-reactive 2,6-dimethylol-4-alkyl phenol, in which the alkyl group was believed to be an octyl group. The GR–I 25 was a commercially available type of Butyl rubber and it was first intimately mixed with the carbon black in a Banbury, after which the Amberol ST–137 was added and the mixing was continued for 20 minutes at 375° F. The batch was discharged on a mill and sheeted out to give a smooth sheet.

The following final compound was then prepared, employing the foregoing modified Butyl master batch:

*Final compound*

| | |
|---|---:|
| Modified Butyl master batch | 226.00 |
| No. 1 smoked sheet | 100.00 |
| MPC carbon black | 50.00 |
| Hydrocarbon oil | 10.00 |
| Zinc oxide | 7.50 |
| Stearic acid | 2.50 |
| Benzothiazyldisulfide | 0.90 |
| Monex (tetramethylthiuram monosulfide) | 0.25 |
| Sulfur | 1.90 |
| | 399.05 |

The amount of modified Butyl master batch employed corresponds to 150 parts of Butyl rubber hydrocarbon. The compound was mixed with the aid of a Banbury mixer and a roll mill in accordance with the usual practice in preparing a vulcanizable rubber composition. The essential feature of this mixture resides in the combination of the modified Butyl with the other rubber, in this case natural rubber in the form of smoked sheet, and the remaining compounding ingredients may be varied at will to provide a typical vulcanizable composition capable of being cured under the conditions customarily employed in molding tires, as will be apparent to the skilled rubber compounder. The mix was formed into a sheet by calendering, and the liner 14 was applied to the interior of the raw tire carcass before shaping the same. It was observed that the liner had unusually good tack, and could be handled and applied to the tire carcass with ease. The sheet spliced satisfactorily, and adhered well to itself as well as to the carcass. Thereafter, the assembly was shaped and vulcanized in the usual manner. In the course of the vulcanization, the liner became permanently adhered to the carcass, without the aid of any previous special adhesive treatment or cement.

Samples of the liner compound of the invention after curing in a press for 45 minutes at 45 pounds of steam pressure had the following properties:

| | |
|---|---:|
| Tensile strength, p. s. i | 1140 |
| Percent elongation at break | 495 |
| Modulus at 300% elongation, p. s. i | 590 |

In contrast to these physical properties, a similar mixture employing Butyl rubber reclaim in place of the chemically modified Butyl rubber employed in the composition of the invention had the following physical properties:

| | |
|---|---:|
| Tensile, p. s. i | 580 |
| Percent elongation at break | 590 |
| Modulus at 300% elongation, p. s. i | 215 |

The superiority of the liner of the invention will be apparent from a comparison of the two foregoing sets of physical properties.

EXAMPLE II

The foregoing example was repeated, except that in the initial step of chemically modifying the Butyl with one part of Amberol ST–137, there was also included in the mixture at this stage 0.5 part of stannous chloride, which served to accelerate the reaction between the Butyl rubber and the Amberol ST–137 resin, so that the desired chemical modification was completed within 10 minutes at a temperature of 350–375° F. After mixing the thus-modified Butyl rubber with natural rubber as described in Example I, and vulcanizing the resulting liner composition, there was obtained a liner material having physical properties similar to that of the material described in Example I.

The foregoing example illustrates a modification of the invention in which an accelerating material is employed to facilitate the reaction between the resol phenolic resin and the Butyl rubber. Heavy metal chlorides, particularly stannous chloride, or stannic chloride, iron chloride, zinc chloride, or chlorides of any of the other heavy metals are suitable for this purpose. Another class of materials that can be used to accelerate the reaction between the Butyl rubber and the phenolic resin are the organic sulfonic acids, including mixed alkane sulfonic acids (e. g., mixture containing methane, ethane, and propane sulfonic acids), p-toluene sulfonic acid, and beta-naphthalene sulfonic acid, etc. Such accelerating substances are usually employed in amount of from about 0.1 to 2.0 parts, and preferably in amount of from about 0.15 to 1.5 parts, along with from about 0.5 to 2.5 parts of the resol phenolic resin. The desired reaction is completed within about 5 to 15 minutes at temperatures of 350–375° F. when employing such accelerators, whereas without such accelerators substantially longer reaction times would be required.

EXAMPLE III

Example II was repeated except that 0.5 part of p-toluene sulfonic acid was used as the accelerating material to promote the reaction between the Amberol ST–137 and the Butyl rubber, in place of stannous chloride. The reaction was completed in 10 minutes at 350–375° F., and the physical properties of the final liner material, after mixing the thus-modified Butyl rubber with natural rubber and vulcanizing, were equivalent to those of the material of Example I.

The superiority of the liner material of the present invention may be further demonstrated by making up a number of tires with a liner similar to those described in the foregoing examples, and mounting them at a definite standard inflation pressure. The tires are subjected to a standard load, while running against a cleated test wheel at a definite speed. Under the conditions of the test, the tires made in accordance with the invention will be found to run without failure for an average number of hours substantially in excess of the number of hours before failure of tubeless tires with liners made of a similar composition, but based on Butyl inner tube reclaim, instead of on chemically modified Butyl rubber in accordance with the invention. The invention therefore definitely improves the quality of the tire. In addition to improved life, the tires embodying the liner of the invention will be found to display little cracking in the liner stock as compared to the liner stock based on reclaim Butyl, which becomes exceptionally badly cracked under such conditions.

The improvement realized with the liner composition of the invention is believed to be due at least in part to the fact that the chemical treatment of the Butyl rubber under the critical conditions employed in the invention does not result in any powerful residual accelerating or curing material being present in the Butyl. In any event, Butyl reclaim, or any Butyl rubber that has first been substantially cured with the usual vulcanizing agents and accelerators, and thereafter refined to approximately a reclaim, is not capable of providing a liner composition that at once has good splicing qualities and does not crack in use, while being singularly immune to progressive deterioration and undesirable change in physical properties, as the liner compositions made in accordance with the invention are.

Having thus described our invention, what we claim and desire to protect by Letters Patent is:

A method of making a tubeless tire comprising in combination the steps of chemically modifying a raw rubbery copolymer of an isoolefin having from 4 to 6 carbon atoms with from 0.5 to 10% of a conjugated diolefin having from 4 to 8 carbon atoms by masticating 100 parts of said rubbery copolymer with from 0.1 to 4.0 parts of a 2,6-dimethylol-4-hydrocarbon substituted phenol resin for from 3 minutes at 400° F. to 60 minutes at 300° F., the thus chemically modified copolymer substantially retaining its original readily processible condition and sheet-forming properties, whereby the thus-modified coploymer is directly compatible without mill breakdown with natural rubber and butadiene-styrene copolymer rubber, thereafter mixing from 45 to 75% by weight of the thus-modified copolymer directly without mill breakdown with correspondingly from 55 to 25% of a rubber selected from the group consisting of natural rubber and butadiene-styrene copolymer rubber, and vulcanizing ingredients therefor, applying the resulting composition as an air-retaining liner directly adhered to the entire interior surface of a tire casing from one bead area thereof to the other, said tire casing having a carcass comprising cord fabric coated with a vulcanizable rubber composition selected from the group consisting of natural rubber and butadiene-styrene copolymer rubber, and thereafter vulcanizing the assembly in tire shape, whereby the said liner adheres firmly to the said carcass.

References Cited in the file of this patent
UNITED STATES PATENTS

| | | |
|---|---|---|
| 2,566,328 | Hessney et al. | Sept. 4, 1951 |
| 2,566,384 | Tilton | Sept. 4, 1951 |
| 2,575,249 | Connell et al. | Nov. 13, 1951 |
| 2,649,432 | Little | Aug. 18, 1953 |
| 2,676,636 | Sarbach | Apr. 27, 1954 |
| 2,698,041 | Morrissey et al. | Dec. 28, 1954 |
| 2,702,286 | Iknayan et al. | Feb. 15, 1955 |
| 2,702,287 | Iknayan et al. | Feb. 15, 1955 |
| 2,726,224 | Peterson et al. | Dec. 6, 1955 |
| 2,727,874 | Peterson et al. | Dec. 20, 1955 |

OTHER REFERENCES

"Rubber Age," January 1947, page 449.